United States Patent
Lewis et al.

(10) Patent No.: US 11,544,342 B1
(45) Date of Patent: *Jan. 3, 2023

(54) SELECTING CONTENT FOR CO-LOCATED DEVICES

(71) Applicant: Google LLC, Mountain View, CA (US)

(72) Inventors: Justin Lewis, South San Francisco, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/199,160

(22) Filed: Mar. 11, 2021

Related U.S. Application Data

(63) Continuation of application No. 14/322,402, filed on Jul. 2, 2014, now Pat. No. 10,970,352.

(51) Int. Cl.
   *G06F 16/955* (2019.01)
(52) U.S. Cl.
   CPC .................................. *G06F 16/955* (2019.01)
(58) Field of Classification Search
   CPC ... G06F 16/954; G06F 16/955; G06F 16/9554
   See application file for complete search history.

(56) References Cited

U.S. PATENT DOCUMENTS

| | | | |
|---|---|---|---|
| 8,326,221 B2 | 12/2012 | Dorsey | |
| 8,489,079 B2 | 3/2013 | Hintermeister et al. | |
| 2005/0113115 A1 | 5/2005 | Haberman et al. | |
| 2005/0138138 A1 | 6/2005 | Jelinek et al. | |
| 2008/0300985 A1 | 12/2008 | Shamp et al. | |
| 2011/0185437 A1 | 7/2011 | Tran et al. | |
| 2012/0047011 A1 | 2/2012 | Rippetoe et al. | |
| 2012/0066067 A1 | 3/2012 | Curtis et al. | |
| 2013/0260691 A1 | 3/2013 | Hintermeister et al. | |
| 2014/0272905 A1 | 9/2014 | Boersma | |
| 2015/0054655 A1 | 2/2015 | Bailey et al. | |
| 2015/0074047 A1 | 3/2015 | Gardes et al. | |
| 2015/0135328 A1 | 5/2015 | Ellis et al. | |
| 2015/0242420 A1* | 8/2015 | Glover | G06F 16/29 707/724 |

FOREIGN PATENT DOCUMENTS

EP          2169925          3/2010

* cited by examiner

*Primary Examiner* — Ashish Thomas
*Assistant Examiner* — Dustin D Eyers
(74) *Attorney, Agent, or Firm* — Fish & Richardson P.C.

(57) ABSTRACT

Methods, systems, and apparatus include computer programs encoded on a computer-readable storage medium, including a method for providing content. Co-located devices are identified, including first and second devices associated with first and second users. A determination is made that a device is configured to be viewable by multiple users based on device characteristics. Use data is gathered that is associated with current sessions associated with users related to their use of their respective devices, including first data related to the use of the first device and second data related to the use of the second device. The first and second data are aggregated and evaluated to identify a first content item to present on the first device. Second different content items are selected for display on other co-located devices based at least in part on the first content item.

20 Claims, 4 Drawing Sheets

300

```
┌─────────────────────────────────────────────────────────────┐
│ Identify a set of co-located devices including at least a   │
│ first device and a second device that are currently in      │
│ proximity to each other including determining that the      │
│ first device and the second device are connected on a       │
│ same local network                                          │
│                                                         302 │
└─────────────────────────────────────────────────────────────┘
                              │
                              ▼
┌─────────────────────────────────────────────────────────────┐
│ Determine that a particular one of the co-located devices   │
│ is configured to be viewable by multiple users based on     │
│ device characteristics                                  304 │
└─────────────────────────────────────────────────────────────┘
                              │
                              ▼
┌─────────────────────────────────────────────────────────────┐
│ Gather use data associated with current sessions associated │
│ with the users related to their use of their respective     │
│ devices including gathering first data related to the use   │
│ of the first device by a first user and second data related │
│ to the use of the second device by a second user for their  │
│ current sessions                                        306 │
└─────────────────────────────────────────────────────────────┘
                              │
                              ▼
┌─────────────────────────────────────────────────────────────┐
│ Aggregate the first and second data to create aggregate     │
│ data related to use of both the first and second devices    │
│                                                         308 │
└─────────────────────────────────────────────────────────────┘
                              │
                              ▼
┌─────────────────────────────────────────────────────────────┐
│ Evaluate the aggregate data including using the aggregate   │
│ data to identify first content to present on the particular │
│ one of the co-located devices                           310 │
└─────────────────────────────────────────────────────────────┘
                              │
                              ▼
┌─────────────────────────────────────────────────────────────┐
│ Select second different content items for display on other  │
│ ones of the co-located devices based at least in part on    │
│ the first content item                                  312 │
└─────────────────────────────────────────────────────────────┘
```

FIG. 3

SELECTING CONTENT FOR CO-LOCATED DEVICES

CROSS-REFERENCE TO RELATED APPLICATIONS

This application is a continuation application of, and claims priority to, U.S. patent application Ser. No. 14/322,402, titled "SELECTING CONTENT FOR CO-LOCATED DEVICES," filed on Jul. 2, 2014. The disclosure of the foregoing application is incorporated herein by reference in its entirety for all purposes.

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented.

SUMMARY

In general, one innovative aspect of the subject matter described in this specification can be implemented in methods that include a computer-implemented method for providing content. The method includes identifying a set of co-located devices including at least a first device and a second device that are currently in proximity to each other including determining that the first device and the second device are connected on a same local network. The method further includes determining that a particular one of the co-located devices is configured to be viewable by multiple users. The method further includes gathering use data associated with current sessions associated with the users related to their use of their respective devices including gathering first data related to the use of the first device by a first user and second data related to the use of the second device by a second user for their current sessions. The method further includes aggregating the first and second data to create aggregate data related to use of both the first and second devices. The method further includes evaluating the aggregate data including using the aggregate data to identify first content to present on the particular one of the co-located devices. The method further includes selecting second different content items for display on other ones of the co-located devices based at least in part on the first content item.

These and other implementations can each optionally include one or more of the following features. Identifying a set of co-located devices can include receiving location information for both the first and second device, evaluating the received location information to determine a relative distance between the first and second devices, and comparing the relative distance to a threshold. The method can further include receiving login information for both the first and second users from their respective devices, and evaluating the aggregate data can further include evaluating respective profiles associated with the first and second user to identify the first content. Determining that a particular one of the co-located devices is configured to be viewable by multiple users can include determining a screen size associated with the particular one of the co-located devices and determining that the screen size is above a threshold size. Gathering use data can include gathering data for only as long as the first and second devices are co-located. The method can further include identifying filters to be associated with the aggregate data based on one or more characteristics associated with the first and second users, and filtering content selections based on the identified filters prior to presentation on the particular one of the co-located devices. The method can further include receiving from the particular one of the co-located devices a request for content, and providing the first content for presentation on the particular one of the co-located devices based on the evaluating. The method can further include storing the aggregate data for use in selecting content only as long as the first and second device are co-located. The method can further include using the aggregate data to select content for presentation on other ones of the co-located devices.

In general, another innovative aspect of the subject matter described in this specification can be implemented in computer program products that include a computer program product tangibly embodied in a computer-readable storage device and comprising instructions. The instructions, when executed by one or more processors, cause the processor to: identify a set of co-located devices including at least a first device and a second device that are associated with users and are currently in proximity to each other including determining that the first device and the second device are connected on a same local network; determine that a particular one of the co-located devices is configured to be viewable by multiple users based on device characteristics; gather use data associated with current sessions associated with the users related to their use of their respective devices including gathering first data related to the use of the first device by a first user and second data related to the use of the second device by a second user for their current sessions; aggregate the first and second data to create aggregate data related to use of both the first and second devices; evaluate the aggregate data including using the aggregate data to identify first content to present on the particular one of the co-located devices; and select second different content items for display on other ones of the co-located devices based at least in part on the first content item.

These and other implementations can each optionally include one or more of the following features. Identifying a set of co-located devices can include receiving location information for both the first and second device, evaluating the received location information to determine a relative distance between the first and second devices, and comparing the relative distance to a threshold. The instructions can further include instructions for receiving login information for both the first and second users from their respective devices, and evaluating the aggregate data can further include evaluating respective profiles associated with the first and second user to identify the first content. Determining that a particular one of the co-located devices is configured to be viewable by multiple users can include determining a screen size associated with the particular one of the co-located devices and determining that the screen size is above a threshold size. Gathering use data can include gathering data for only as long as the first and second devices are co-located. The instructions can further include instructions for identifying filters to be associated with the aggregate data based on one or more characteristics associated with the first and second users, and filtering content selections based on the identified filters prior to presentation on the particular one of the co-located devices.

In general, another innovative aspect of the subject matter described in this specification can be implemented in systems, including a system comprising one or more processors and one or more memory elements including instructions. The instructions, when executed, cause the one or more processors to: identify a set of co-located devices including at least a first device and a second device that are associated with users and are currently in proximity to each other including determining that the first device and the second device are connected on a same local network; determine that a particular one of the co-located devices is configured to be viewable by multiple users based on device characteristics; gather use data associated with current sessions associated with the users related to their use of their respective devices including gathering first data related to the use of the first device by a first user and second data related to the use of the second device by a second user for their current sessions; aggregate the first and second data to create aggregate data related to use of both the first and second devices; evaluate the aggregate data including using the aggregate data to identify first content to present on the particular one of the co-located devices; and select second different content items for display on other ones of the co-located devices based at least in part on the first content item.

These and other implementations can each optionally include one or more of the following features. Identifying a set of co-located devices can include receiving location information for both the first and second device, evaluating the received location information to determine a relative distance between the first and second devices, and comparing the relative distance to a threshold. The instructions can further include instructions for receiving login information for both the first and second users from their respective devices, and evaluating the aggregate data can further include evaluating respective profiles associated with the first and second user to identify the first content. Determining that a particular one of the co-located devices is configured to be viewable by multiple users can include determining a screen size associated with the particular one of the co-located devices and determining that the screen size is above a threshold size. Gathering use data can include gathering data for only as long as the first and second devices are co-located.

Particular implementations may realize none, one or more of the following advantages. A content item can be presented to a co-located user device (e.g., a networked television) having enhanced presentation characteristics rather than, or in addition to, presenting the content item on a user device having limited display capabilities, for example, having a small screen (e.g., smartphone).

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for selecting content based on aggregated use data associated with users of co-located devices.

Like reference numbers and designations in the various drawings indicate like elements.

DETAILED DESCRIPTION

Figure 1:
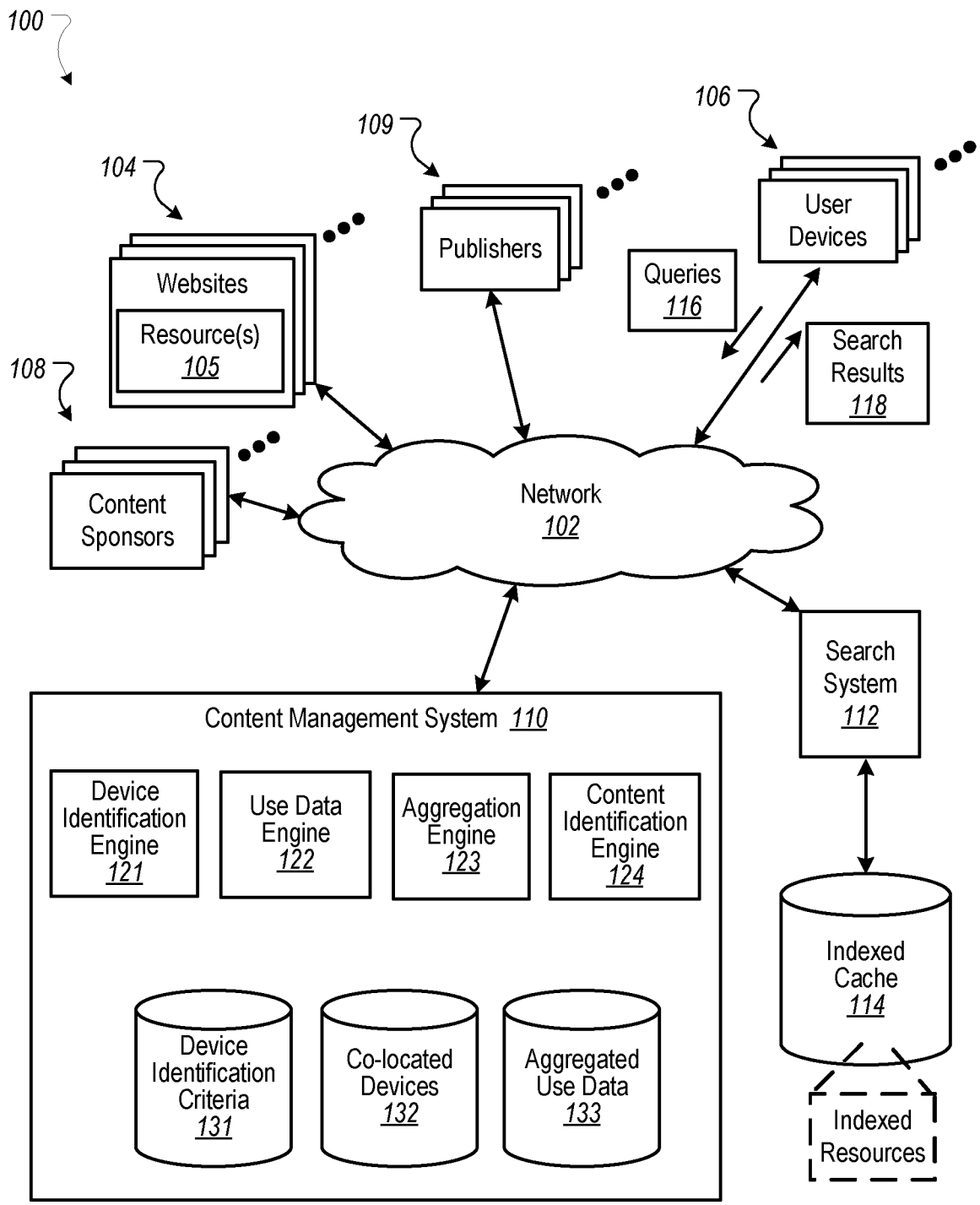
FIG. 1 is a block diagram of an example environment for delivering content.

Systems, methods, computer program products and mechanisms are described for providing content to co-located devices. For example, a set of co-located devices can be identified, including a first device and at least one second device. The devices can be associated with the same user or different users and can be concurrently in proximity to each other. A determination can be made that a particular one (e.g., the first device, such as a large-screen television) of the co-located devices is configured to be (or intended to be) viewable by multiple users based on device characteristics (e.g., indicative of at least one of a capability of the device or a quality presentation of content presentation to users. Use data can be gathered that is associated with current sessions associated with the users related to their use of their respective devices. Gathering the use data can include gathering first data related to the use of the first device by a first user and second data related to the use of the second different device(s) (e.g., by the second user(s)) for their current sessions. The first and second data can be aggregated to create aggregate data related to use of both the first and second devices. The aggregate data can be evaluated, including using the aggregate data to identify content (e.g., advertisements) to present on the particular one of the co-located devices. Based at least on the first content item, second different content items can be selected for presentation on the second device(s). For example, when it is known that a user is likely to be in the proximity of the first device (e.g., the large-screen television) that is showing a particular advertisement, then similar versions of the same advertisement (or different, complementary advertisements) can be selected for presentation to the user for display on the user's mobile device (e.g., a smartphone, tablet, wearable, etc.).

In some implementations, determining co-located devices can be limited to user devices that are associated with the same user. For example, the user's smartphone can be determined to be in proximity to the user's networked television. In some implementations, other users' devices can be included in determining co-located devices.

For situations in which the systems discussed here collect and/or use information including personal information about users and/or use data associated with the user's use of a device, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined. In some implementations, respective users can be notified that their devices may be involved in determining co-located devices with other users or providing data for the co-location determination. In some implementations, respective users can control whether or not to allow their devices to be involved.

In some implementations, users can specify whether or not to allow their devices or data associated with their respective devices to be used (such as for example to determine co-located devices). For example, users can specify that their devices are not authorized to determine co-located devices or provide data for a determination of co-location. In some implementations, users can specify authorizations in privacy settings and/or other interfaces. For example, users can be notified that this functionality is available and asked if they want their devices to participate.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

The environment 100 can include plural data stores, which can be stored locally by the content management system 110, stored somewhere else and accessible using the network 102, generated as needed from various data sources, or some combination of these. A data store of device identification criteria 131, for example, can include criteria used to identify devices and to determine whether devices are co-located and/or qualify for follow up content. For example, the criteria can include device characteristics, e.g., that identify a minimum screen size for which devices are to be identified for receipt of content in follow-on opportunities. A data store of co-located devices 132, for example, can include information that identifies user devices that are co-located, e.g., in proximity to each other, to be used to present content to the co-located devices. A data store of aggregate use data 133, for example, can include information that identifies the aggregate use data for devices that are co-located. For example, the aggregate use data can identify uses that overlap for devices that have been determined to be in proximity, the use data identifying, for example, a user's video watching history, web site visitation history, and/or other use data on a per-user and/or a per-device basis.

The content management system 110 can include plural engines, some or all of which may be separate or combined, and may be co-located or distributed (e.g., connected over the network 102). A device identification engine 121, for example, can identify user devices that are co-located (e.g., in proximity) and to which content is to be provided. For example, user devices 106 that are in the same area (e.g., the same room) can be identified as being co-located because they share the same, or essentially the same, GPS coordinates. Other ways of identifying co-located user devices can be used, e.g., near-field communication (NFC), a shared WiFi network or location, or other device co-location determination techniques.

A use data engine 122, for example, can gather use data that is associated with current sessions associated with the users related to their use of their respective devices and for their respective current sessions. For example, the use data engine 122 can gather data that indicates a user's substantially recent history related to video watching, web site visitation, and/or other use data on a per-user basis. For example, the use data can be based, at least in part, on content identified by the content management system 110 as being provided to specific devices, e.g., recently. Other ways of gathering and types of use data are possible.

An aggregation engine 123, for example, can aggregate data received from co-located devices to provide aggregate use data 133. For example, the aggregate use data can represent a union of use data for the respective devices, and can also identify the number of devices that used the data and duration that the data was used.

A content identification engine 124, for example, can identify content items (e.g., advertisements) that are responsive to received requests for content. Identifying the content items can include, for example, the use of keywords to identify eligible content items, as described above. Content items can also be selected based on their likely performance in situations in which content is selected for co-located devices, e.g., for providing content items for follow-on opportunities.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. Search results pages can also include one or more slots in which other content items (e.g., advertisements) can be presented.

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request (e.g., eligible content items). For example, eligible content items can include eligible ads having characteristics matching the characteristics of ad slots and that are identified as relevant to specified resource keywords or search queries 116. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
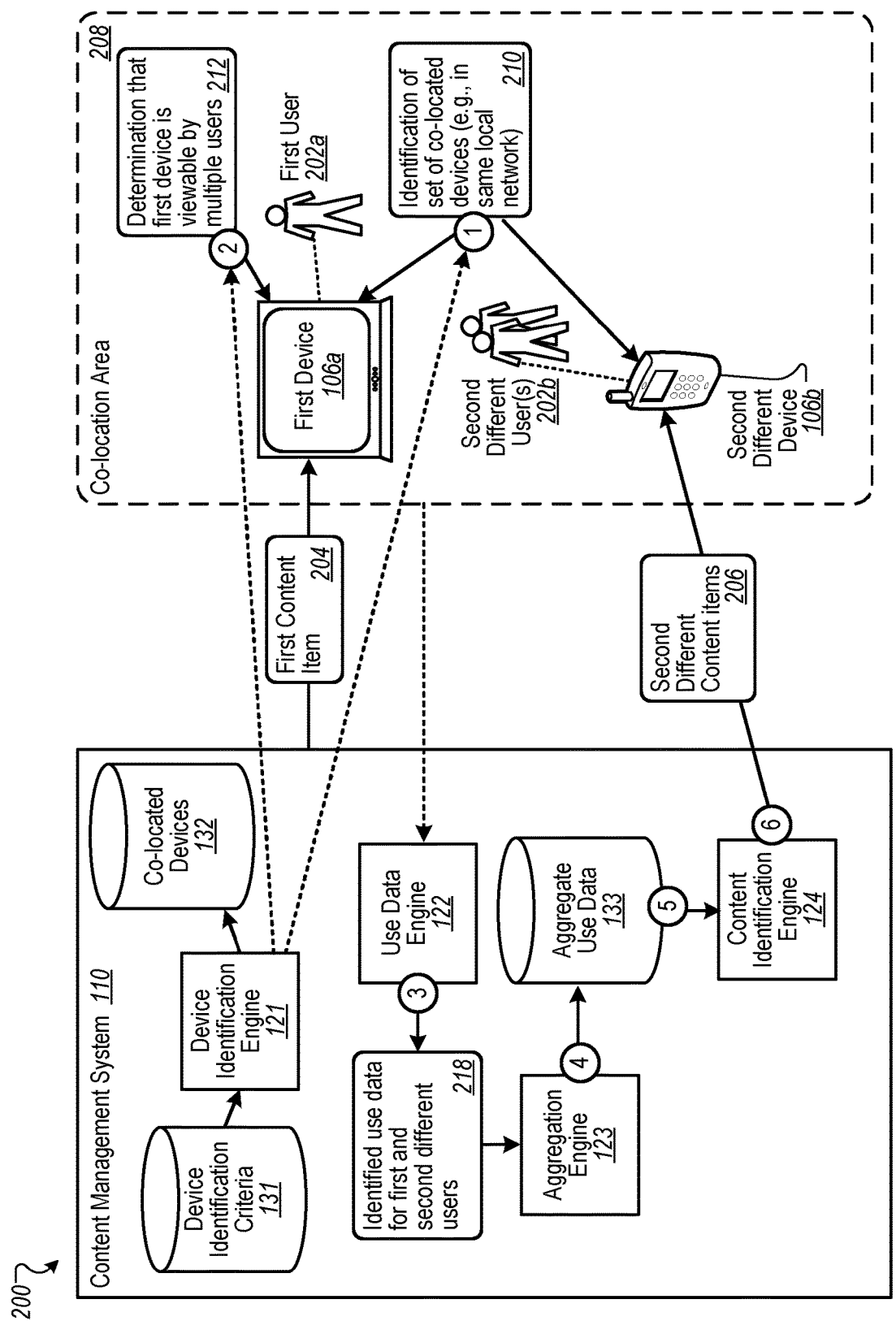
FIG. 2 shows an example system for providing content.

FIG. 2 shows an example system 200 for providing content. The system 200 can determine that a first device 106a, such as a large screen television that is viewable by multiple users, is co-located with at least one second device 106b (i.e. different from the first device 106a). For example, determining that the devices are co-located can include determining that the first device 106a and the second device 106b are connected on a same local network, or device proximity can be determined in other ways. The devices 106a, 106b can be associated with a first user 202a and at least one second user 202b, respectively. The content management system 110 can select a first content item 204 for presentation to the first device 106a. The content management system 110, for example, can select second different content items 206 that are selected, at least in part, based on the first content item 204. For example, the second different content items 206 can include content (e.g., advertisements) that is complementary to the content of the first content item 204. Selection of the content items 204, 206 can be based on use data that is gathered, aggregated and evaluated by the content management system 110 and/or its components. For example, the gathered use data can be associated with current sessions for the users 202a, 202b related to their use of their respective devices 106a, 106b, and for their current sessions. Gathering use data, for example, can include gathering first data related to the use of the first device 106a by the first user 202a and second data related to the use of the second device 106b by the second user 202b. The content management system 110 can aggregate the first and second data to create aggregate data related to use of both the first and second devices 106a, 106b. The content management system 110 can evaluate the aggregate data including using the aggregate data to identify first content (e.g., the first content item 204) to present on the particular one (e.g., the first device 106a) of the co-located devices, e.g., for presentation to both the first user 202a and the second user 202b.

Example first devices 106a and second devices 106b include a mobile telephone, a mobile electronic device, a desktop computer, or another electronic device. In some implementations, the following example sequence of stages can be used to provide content based on co-located devices.

At stage 1, for example, the device identification engine 121 can identify (210) the set of co-located devices, e.g. the first device 106a and at least one second device 106b. In this example, the first device 106a and the second device(s) 106b are associated with users (e.g., the first user 202a and the second user(s) 202b) and are currently in proximity to each other. The device identification engine 121 can determine, for example, that the first device 106a and the second device 106b are connected on a same local network, such as the same WiFi network or WiFi location. In some implementations, determining that devices are co-located can also include the use of GPS, near-field communication (NFC), or some other suitable technique(s) that indicates that devices are in the same area. In some implementations, identification of devices may be made, for example, when the first device 106a is currently receiving (or has recently received) content (e.g., resources, videos, advertisements, etc.) from the content management system 110. In some implementations, the device identification engine 121 can store information related to the devices being co-located in the data store of co-located devices 132.

At stage 2, for example, the device identification engine 121 can determine (212) that the first device 106a is configured to be viewable by multiple users based on device characteristics. In some implementations, the device identification engine 121 can make the determination using information associated with characteristics of the first device 106a, such as a device type, a screen size, and/or other characteristics that can be indicative of the capability and quality of content presentation to multiple users. For example, the first device 106a can be a large-screen television that is networked to the Internet and under control the first user 202a.

At stage 3, for example, the use data engine 122 can gather use data 218 that is associated with current sessions associated with the different user devices (e.g., associated with the same or different users) for their respective current sessions. For example, the use data engine 122 can gather first data related to the use of the first device 106a by the first user 202a. Further, the use data engine 122 can gather second data related to the use of the second device 106b, e.g., by the second user 202b. In some implementations, use data can include a user's substantially recent history related to video watching, web site visitation, and/or other use data on a per-user basis. Other forms of use data are possible.

At stage 4, for example, the aggregation engine 123 can aggregate the first and second data to create aggregate data related to use of both the first device 106a and the second device 106b. For example, the aggregation engine 123 can combine the use data for the first user 202a and the second user 202b, e.g., to group common uses, such as specific video watching histories or other uses. In some implementations, the aggregation engine 123 can store the aggregate data in the data store of aggregate use data 133, e.g., for use in determining content to be provided to co-located devices during the time they are co-located, or for other purposes. In some implementations, the aggregate data can be weighted, e.g., based on duration of use or a level of intersection between users.

At stage 5, for example, the content identification engine 124 can evaluate the aggregate data including using the aggregate data to identify first content (e.g., an advertisement) to present on the first device 106a, e.g. for presentation to both the first user 202a and the second user 202b. For example, the content identification engine 124 can analyze the aggregate data, including identifying uses that are common to the first and second users. Identification of content, such as a video advertisement for a camera, can be identified in response to a request for content received from the first device 106a. A video advertisement may be selected (e.g., instead of a text advertisements) because of the characteristics of the first device 106a (e.g., large screen size).

At stage 6, for example, the content identification engine 124 can select second different content items for display on other ones of the co-located devices, e.g., the second device(s) 106b, based at least in part on the first content item. For example, the content identification engine 124 can identify content items (e.g., other advertisements) that are related to the first content item. For example, the second different content items 206 that are identified can be advertisements (e.g., text advertisements for cameras) that are complementary to the first content item 204 selected for the first device 106a.

FIG. 3 is a flowchart of an example process 300 for selecting content based on aggregate use data associated with users of co-located devices. In some implementations, the content management system 110 can perform stages of the process 300 using instructions that are executed by one or more processors. FIGS. 1-2 are used to provide example structures for performing the steps of the process 300.

A set of co-located devices is identified including at least a first device and a second device that are associated with users and are currently in proximity to each other, including determining that the first device and the second device are connected on a same local network (302). For example, the device identification engine 121 can identify (210) the first device 106a that is associated with the first user 202a and the second device 106b that is associated with the second user 202b. In some implementations, determining that devices are co-located can include the use of GPS, near-field communication (NFC), a shared WiFi network or location (e.g., based on a provided SSID or MAC address), or other technique(s) that indicate that devices are in the same area. In some implementations, devices can be determined to be co-located by sending and receiving sounds, e.g., between the devices, such as sounds that are audible or sub-audible, or sounds that are inaudible to humans.

In some implementations, identifying a set of co-located devices can include receiving location information for both the first and second device, evaluating the received location information to determine a relative distance between the first and second devices, and comparing the relative distance to a threshold. For example, the device identification engine 121 can use GPS coordinates or other geographic location information for the devices, e.g., to determine that the devices are co-located if they are within 20 feet of each other.

A determination is made that a particular one of the co-located devices is configured to be viewable by multiple users based on device characteristics (304). The device identification engine 121, for example, can identify, for either of the first device 106a or the second device 106b, characteristics of the device. The characteristics can include, for example, a screen size or other characteristics that indicate that the device is configured for a content presentation opportunity to multiple users. For example, the device identification engine 121 can determine (212) that the first device 106a is configured to be viewable by multiple users because the first device 106a is determined to be a large-screen television that is networked to the Internet.

In some implementations, determining that a particular one of the co-located devices is configured to be viewable by multiple users can include determining a screen size associated with the particular one of the co-located devices and determining that the screen size is above a threshold size. For example, the device identification engine 121 can determine that one of the devices 106a or 106b has a screen size that exceeds a threshold (e.g., 6 inches or more), e.g., as identified in the data store of device identification criteria 131. For example, the criteria can include device characteristics, e.g., that identify a minimum screen size. Other ways for determining that a device is viewable by multiple users are possible. For example, instead of or in addition to analyzing screen sizes of devices, the resolution of a display area on a device can be used.

Use data is gathered that is associated with current sessions associated with the users related to their use of their respective devices, including gathering first data related to the use of the first device by a first user and second data related to the use of the second device by a second user for their current sessions (306). For example, the use engine 122 can identify, gather and store (218) use data such as a user's video watching history, web site visitation history, and other use data on a per-user basis. Histories that are used for use data, for example, can be limited to substantially recent histories.

In some implementations, gathering use data can include gathering data for only as long as the first and second devices are co-located. For example, the use data gathered by the content management system 110 can be limited to a time period that includes only the time that the first device 106a and the second device 106b are co-located.

The first and second data are aggregated to create aggregate data related to use of both the first and second devices (308). For example, the content management system 110 can combine the use data for the first user 202a and the second user 202b, e.g., to identify common uses, such as specific video watching histories or other uses. In some implementations, the aggregation engine 123 can store the aggregate data in the data store of aggregate use data 133. In some implementations, the aggregate data can be weighted, e.g., based on a level of intersection between users and/or the amount of time that the content was in use, and ranked, e.g., based on weights.

In some implementations, the process 300 can further include storing the aggregate data for use in selecting content only as long as the first and second device are co-located. For example, the content management system 110 can store the aggregate data only as long as needed, or as long as the first device 106a and second device 106b are co-located.

The aggregate data is evaluated including using the aggregate data to identify first content to present on the particular one of the co-located devices for presentation to one or both the first and the second user (310). For example, the content identification engine 124 can analyze the aggregate data, including, for example, assigning higher weights to uses that are common to the greatest number of co-located users and/or for uses having a longer duration (e.g., time spent by one or more users viewing the content).

Second different content items are selected for display on other ones of the co-located devices based at least in part on the first content item (312). For example, the content identification engine 124 can select second different content items 206 for display on one or more of the second device(s) 106b, based at least in part on the first content item 204. The second different content items 206 that are identified, for example, can be advertisements (e.g., text advertisements for cameras) that are complementary to the first content item 204 selected for the first device 106a.

In some implementations, the process 300 can further include using the aggregate data to select content for presentation on other ones of the co-located devices. For example, the content identification engine 124 can select content (e.g., advertisements), make suggestions (e.g., video suggestions), or perform other content-related actions by evaluating the aggregate data (e.g., using the ranking) for content to present to either or both of the devices 106a and 106b or other devices in proximity.

In some implementations, the process 300 can further include receiving login information for both the first and second users from their respective devices, and evaluating the aggregate data can further include evaluating respective profiles (e.g., based on the received login data) associated with the first and second user to identify the content. As an example, the content identification engine 124 can access and analyze profile information for the users 202a and 202b for use in selecting content. In some implementations, the profile information can be obtained from profiles available for the users 202a and 202b as a result of user logins through a login service or in other ways.

In some implementations, the process 300 can further include identifying filters to be associated with the aggregate data based on one or more characteristics associated with the first and second users, and filtering content selections based on the identified filters prior to presentation on the particular one of the co-located devices. For example, the content that is selected by the content identification engine 134 can be limited to content that is filtered based on the appropriateness of the content (e.g., not too racy), the number of users likely to see the content, the number of users having use data associated in some way with the content, and or in other ways.

In some implementations, the process 300 can further include receiving, from the particular one of the co-located devices, a request for content, and providing a selection for presentation on the particular one of the co-located devices based on the evaluating. For example, the content identification engine 124 can provide the first content item 204 to the first device 106a when a request for content is received from the first device 106a. In some implementations, the process 300 can further include receiving requests for content from the second devices 106b, e.g. subsequently or coincident with the request for content received from the first device 106a. In response, the content identification engine 124 can provide the second different content items 206 to the second devices 106b.

Figure 4:
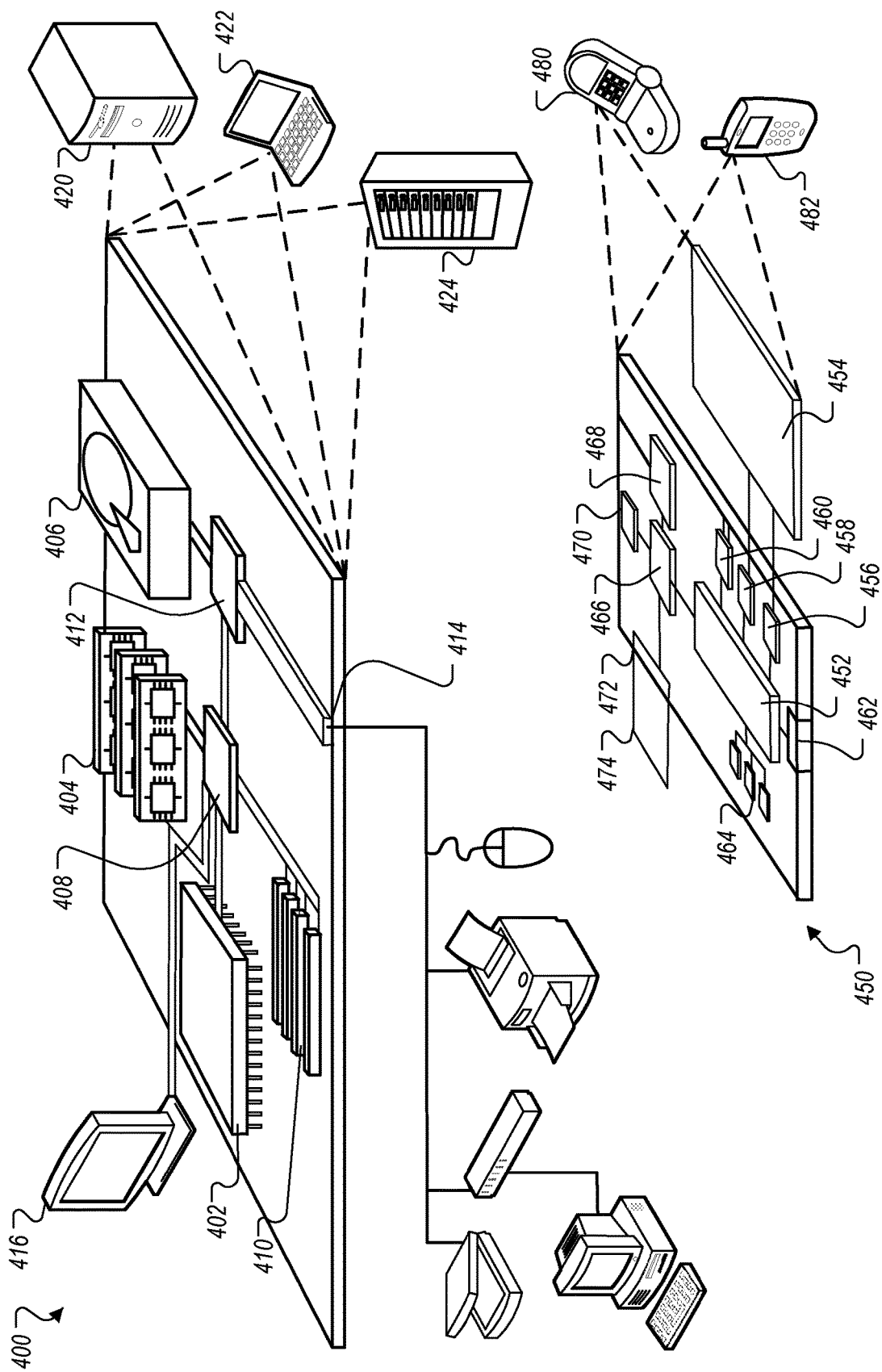
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by one or more computing devices and from multiple user devices, location information including one or more of global positioning system (GPS) information, an indication of near-field communication (NFC) between the multiple user devices, or WiFi data indicating a same WiFi network is being used by the multiple user devices;
identifying, by the one or more computing devices and based on the location information, a set of co-located devices including a networked television and two or more wireless devices that are located at a same geographic location;
gathering, by the one or more computing devices, first data related to usage of the networked television at the same geographic location and second data related to usage of the two or more wireless devices at the same geographic location;
identifying, by the one or more computing devices, first content to present on the networked television based on an evaluation of the first data and the second data;
transmitting, by the one or more computing devices, the first content to the networked television;
selecting, by the one or more computing devices, second different content for display on both of the two or more wireless devices based on the two or more wireless devices being co-located devices with the networked television at the same geographic location while the first content is presented on the networked television; and
transmitting, by the one or more computing devices, the second different content to both of the two or more wireless devices separately while the two or more wireless devices are located at the same geographic location as the networked television and while the first content is being presented on the networked television, wherein the one or more computing devices are located at a different geographic location than the co-located devices and the networked television.

2. The method of claim 1, wherein identifying a set of co-located devices includes receiving location information for both the networked television and the two or more wireless devices, evaluating the received location information to determine a relative distance between the networked television and the two or more wireless devices, and comparing the relative distance to a threshold.

3. The method of claim 1, further comprising receiving login information for both a first user and a second different user from their respective devices, and wherein evaluating the aggregate data further includes evaluating respective profiles of the first user and the second different user to identify the first content.

4. The method of claim 1, wherein identifying the networked television includes determining that the networked television is a television because a screen size of the networked television is above a threshold size.

5. The method of claim 1, wherein gathering use data includes gathering data for only as long as the networked television and the two or more wireless devices are co-located.

6. The method of claim 1, further comprising identifying one or more filters to apply to the aggregate data based on one or more characteristics a first user of the networked television and a second different user of one of the two or more wireless devices, and filtering content selections based on the identified one or more filters prior to identifying the first content for presentation on the networked television.

7. The method of claim 1, further comprising receiving, from the networked television, a request for content, and providing the first content for presentation on the networked television.

8. A non-transitory computer readable medium storing instructions, that when executed, cause one or more processors to perform operations comprising:
receiving, from multiple user devices, location information including one or more of global positioning system (GPS) information, an indication of near-field communication (NFC) between the multiple user devices, or WiFi data indicating a same WiFi network is being used by the multiple user devices;
identifying, based on the location information, a set of co-located devices including a networked television and two or more wireless devices that are located at a same geographic location;
gathering first data related to usage of the networked television at the same geographic location and second data related to usage of the two or more wireless devices at the same geographic location;
identifying first content to present on the networked television based on an evaluation of the first data and the second data;
transmitting the first content to the networked television;
selecting second different content for display on both of the two or more wireless devices based on the two or more wireless devices being co-located devices with the networked television at the same geographic location while the first content is presented on the networked television; and
transmitting the second different content to both of the two or more wireless devices separately while the two or more wireless devices are located at the same geographic location as the networked television and while the first content is being presented on the networked television, wherein the one or more computing devices are located at a different geographic location than the co-located devices and the networked television.

9. The non-transitory computer readable medium of claim 8, wherein identifying a set of co-located devices includes receiving location information for both the networked television and the two or more wireless devices, evaluating the received location information to determine a relative distance between the networked television and the two or more wireless devices, and comparing the relative distance to a threshold.

10. The non-transitory computer readable medium of claim 8, wherein the operations further comprise receiving login information for both a first user and a second different user from their respective devices, and wherein evaluating the aggregate data further includes evaluating respective profiles of the first user and the second different user to identify the first content.

11. The non-transitory computer readable medium of claim 8, wherein identifying the networked television includes determining that the networked television is a television because a screen size of the networked television is above a threshold size.

12. The non-transitory computer readable medium of claim 8, wherein gathering use data includes gathering data for only as long as the networked television and the two or more wireless devices are co-located.

13. The non-transitory computer readable medium of claim 8, wherein the operations further comprise identifying one or more filters to apply to the aggregate data based on one or more characteristics a first user of the networked television and a second different user of one of the two or more wireless devices, and filtering content selections based on the identified one or more filters prior to identifying the first content for presentation on the networked television.

14. The non-transitory computer readable medium of claim 8, wherein the operations further comprise receiving, from the networked television, a request for content, and providing the first content for presentation on the networked television.

15. A system comprising:
one or more processors; and
one or more memory elements including instructions that, when executed, cause the one or more processors to perform operations comprising:
receiving, from multiple user devices, location information including one or more of global positioning system (GPS) information, an indication of near-field communication (NFC) between the multiple user devices, or WiFi data indicating a same WiFi network is being used by the multiple user devices;
identifying, based on the location information, a set of co-located devices including a networked television and two or more wireless devices that are located at a same geographic location;
gathering first data related to usage of the networked television at the same geographic location and second data related to usage of the two or more wireless devices at the same geographic location;
identifying first content to present on the networked television based on an evaluation of the first data and the second data;
transmitting the first content to the networked television;
selecting second different content for display on both of the two or more wireless devices based on the two or more wireless devices being co-located devices with the networked television at the same geographic location while the first content is presented on the networked television; and
transmitting the second different content to both of the two or more wireless devices separately while the two or more wireless devices are located at the same geographic location as the networked television and while the first content is being presented on the networked television, wherein the one or more computing devices are located at a different geographic location than the co-located devices and the networked television.

16. The system of claim 15, wherein identifying a set of co-located devices includes receiving location information for both the networked television and the two or more wireless devices, evaluating the received location information to determine a relative distance between the networked television and the two or more wireless devices, and comparing the relative distance to a threshold.

17. The system of claim 15, wherein the operations further comprise receiving login information for both a first user and a second different user from their respective devices, and wherein evaluating the aggregate data further includes evaluating respective profiles of the first user and the second different user to identify the first content.

18. The system of claim 15, wherein identifying the networked television includes determining that the networked television is a television because a screen size of the networked television is above a threshold size.

19. The system of claim 15, wherein gathering use data includes gathering data for only as long as the networked television and the two or more wireless devices are co-located.

20. The system of claim 15, wherein the operations further comprise identifying one or more filters to apply to the aggregate data based on one or more characteristics a first user of the networked television and a second different user of one of the two or more wireless devices, and filtering content selections based on the identified one or more filters prior to identifying the first content for presentation on the networked television.

* * * * *